(12) United States Patent
Wagner

(10) Patent No.: US 8,890,671 B2
(45) Date of Patent: Nov. 18, 2014

(54) BACK WINDOW FOR A MOTOR VEHICLE, A MOTOR VEHICLE COMPRISING SUCH A BACK WINDOW, AND METHOD FOR DISPLAYING INFORMATION RELATING TO A PARKING PROCESS ON A DISPLAY ELEMENT

(75) Inventor: Nikolas Wagner, Eltville-Rauenthal (DE)

(73) Assignee: GM Global Technology Operations LLC, Detroit, MI (US)

( * ) Notice: Subject to any disclaimer, the term of this patent is extended or adjusted under 35 U.S.C. 154(b) by 197 days.

(21) Appl. No.: 13/441,175

(22) Filed: Apr. 6, 2012

(65) Prior Publication Data

US 2012/0274458 A1   Nov. 1, 2012

(30) Foreign Application Priority Data

Apr. 8, 2011   (DE) .......................... 10 2011 016 430

(51) Int. Cl.
| | |
|---|---|
| *B60Q 1/00* | (2006.01) |
| *B60Q 1/30* | (2006.01) |
| *B60Q 9/00* | (2006.01) |
| *B60K 35/00* | (2006.01) |
| *F21V 8/00* | (2006.01) |

(52) U.S. Cl.
CPC .............. *B60Q 1/302* (2013.01); *G02B 6/0068* (2013.01); *B60K 2350/921* (2013.01); *B60Q 9/007* (2013.01); *B60K 35/00* (2013.01); *G02B 6/006* (2013.01); *B60K 2350/203* (2013.01); *G02B 6/0041* (2013.01); *B60K 2350/2095* (2013.01)
USPC ............ 340/435; 340/473; 340/468; 340/480

(58) Field of Classification Search
USPC .................................. 340/473, 468, 480, 435
See application file for complete search history.

(56) References Cited

U.S. PATENT DOCUMENTS

| | | | |
|---|---|---|---|
| 4,811,507 A | | 3/1989 | Blanchet |
| 5,053,746 A | * | 10/1991 | Taneo ........................... 340/473 |
| 5,634,708 A | | 6/1997 | Koie et al. |
| 6,276,079 B1 | * | 8/2001 | Tijanic ........................... 40/591 |
| 2009/0278347 A1 | | 11/2009 | Kerin et al. |
| 2010/0253598 A1 | | 10/2010 | Szezerba et al. |

FOREIGN PATENT DOCUMENTS

| | | |
|---|---|---|
| DE | 4127656 A1 | 2/1993 |
| DE | 19844773 A1 | 4/2000 |
| DE | 10147267 A1 | 4/2003 |
| DE | 202004019815 U1 | 2/2005 |
| DE | 60311193 T2 | 11/2007 |

(Continued)

OTHER PUBLICATIONS

German Patent Office, German Search Report dated Mar. 19, 2012 for German Application No. 102011016430.8.

*Primary Examiner* — Daryl Pope
(74) *Attorney, Agent, or Firm* — Ingrassia Fisher & Lorenz, P.C.

(57) ABSTRACT

A back window for a motor vehicle comprises a display element, wherein the display element comprises at least one light conductor panel. The light conductor panel comprises a first main surface, a second main surface and at least one marginal surface. The light conductor panel also comprises light-decoupling structures at least in a part region of a volume of the light conductor panel, wherein the light-decoupling structures are embodied as light-diffusing nano particles.

19 Claims, 3 Drawing Sheets

(56) References Cited

FOREIGN PATENT DOCUMENTS

| | | |
|---|---|---|
| DE | 102007012571 A1 | 1/2008 |
| DE | 102006056966 A1 | 6/2008 |
| DE | 102008051393 A1 | 9/2009 |
| DE | 102008020561 A1 | 10/2009 |
| DE | 102009020561 A1 | 11/2009 |
| DE | 102010013398 A1 | 11/2010 |
| EP | 2219056 A1 | 8/2010 |
| JP | 2256535 A | 10/1990 |
| JP | 2007331506 A | 12/2007 |

\* cited by examiner

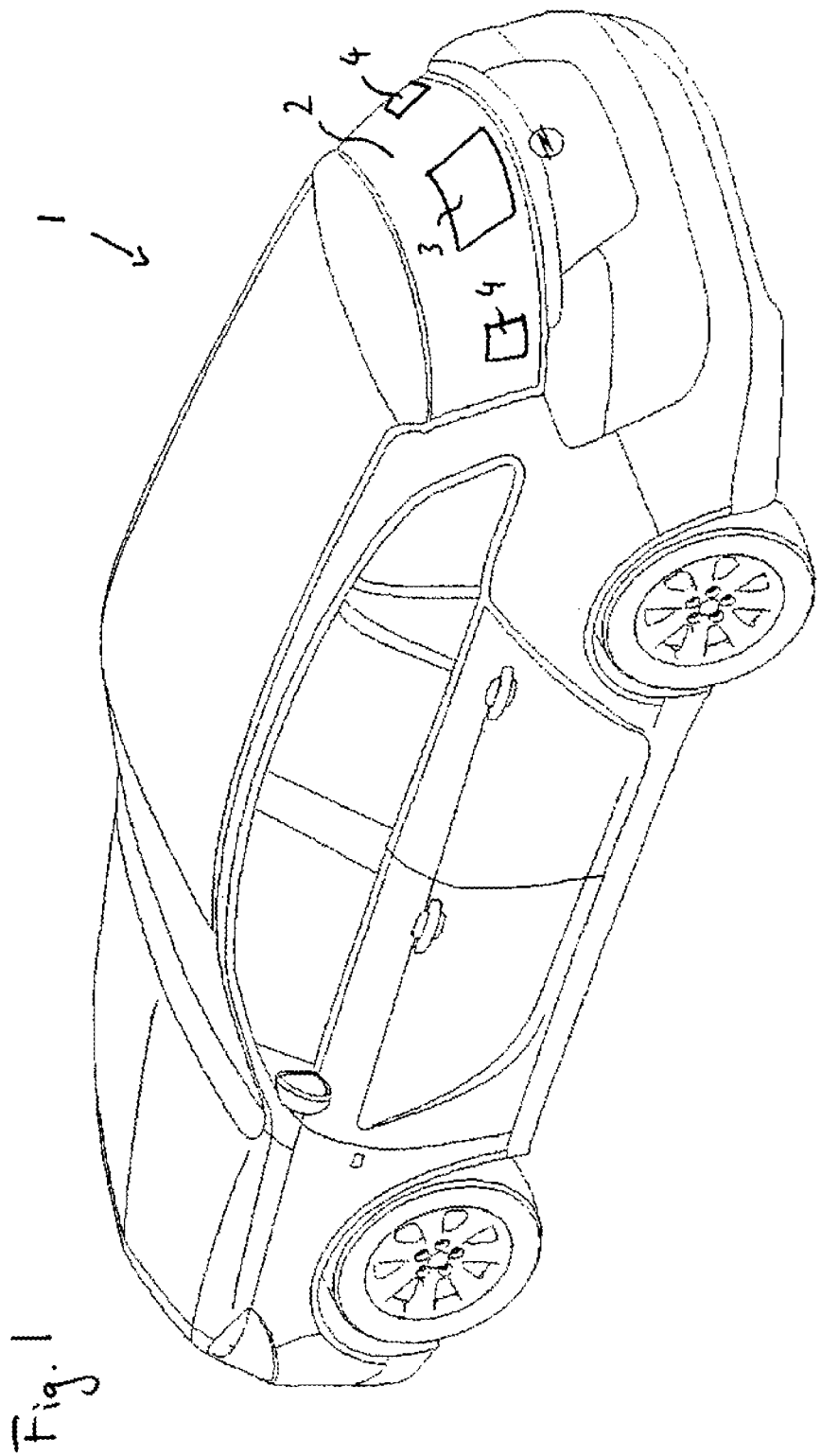

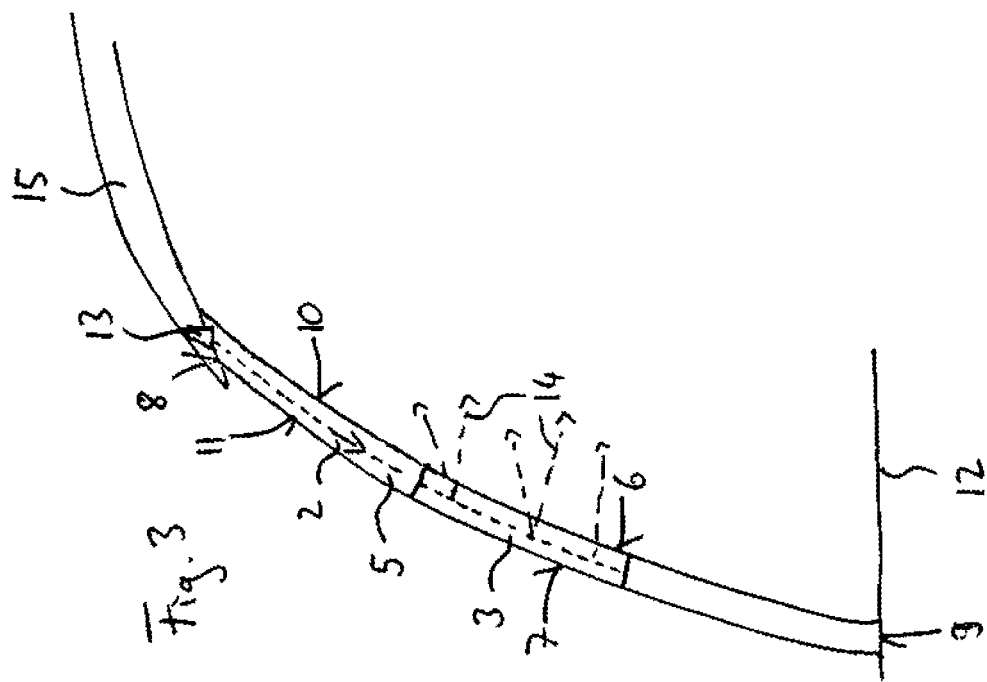
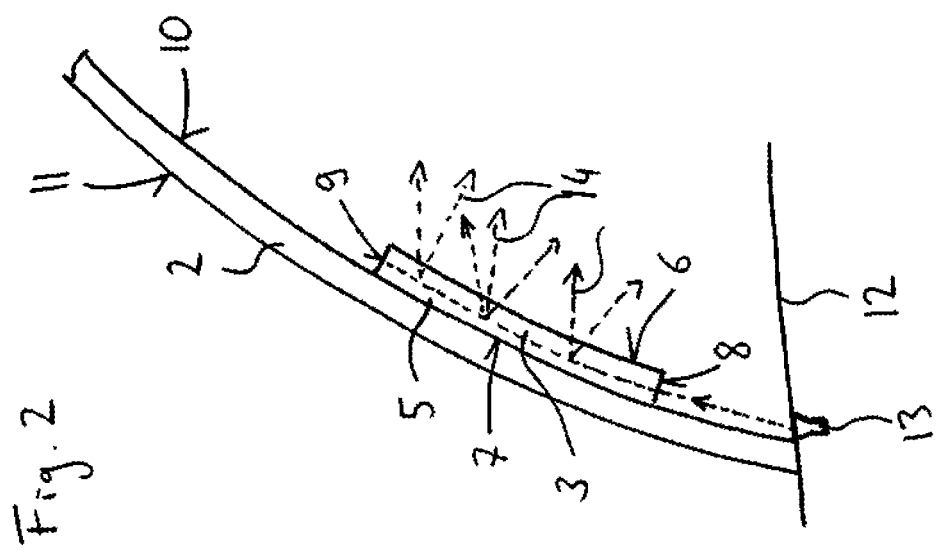

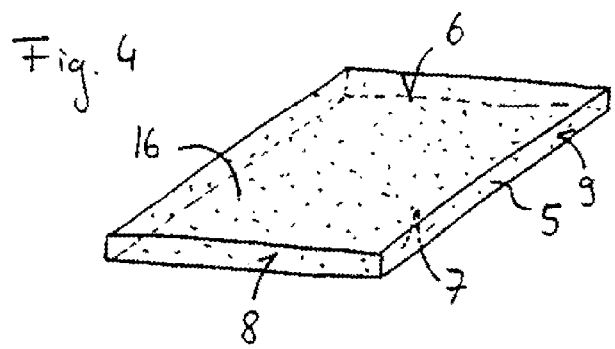
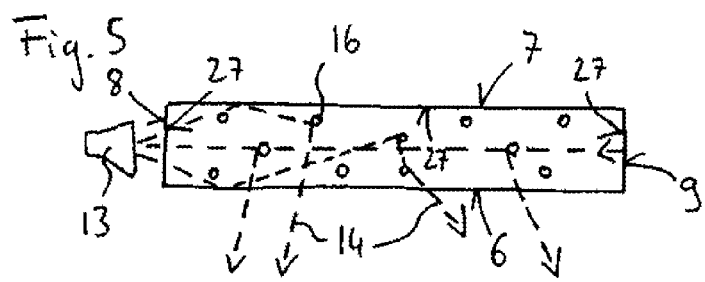
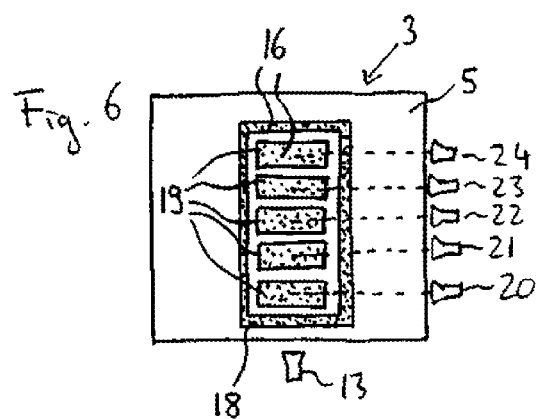
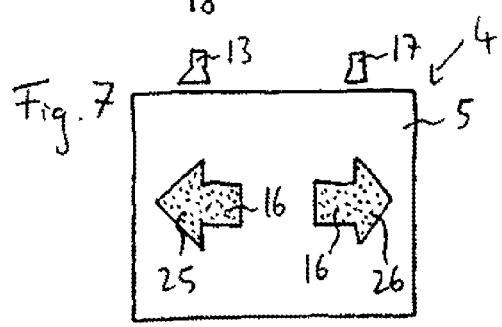

BACK WINDOW FOR A MOTOR VEHICLE, A MOTOR VEHICLE COMPRISING SUCH A BACK WINDOW, AND METHOD FOR DISPLAYING INFORMATION RELATING TO A PARKING PROCESS ON A DISPLAY ELEMENT

CROSS-REFERENCE TO RELATED APPLICATION

This application claims priority to German Patent Application No. 10 2011 016 430.8, filed Apr. 8, 2011, which is incorporated herein by reference in its entirety.

TECHNICAL FIELD

The technical field generally relates to a back window for a motor vehicle, in the region of which a display element for information relating to a parking process is arranged. It relates furthermore to a method for displaying information relating to a parking process on a display element.

BACKGROUND

Parking aids or park assist functions mostly measure the distance in front of and behind the vehicle by means of ultrasound or radar sensors and warn the driver about collisions during parking. The warning is effected through acoustic and/or visual signals.

From DE 10 2008 020 561 A1 a parking aid is known. The distance to a point at which the vehicle has to be stoppe, is shown to the driver on a visual display in the form of a progress bar.

Such a visual display is typically integrated in the instrument cluster of the vehicle or in a display in the region of the centre console. Occasionally, displays or LED displays in the region of the back window for assistance when backing up are also known.

Parking aids, which are intended to assist the driver when maneuvering into narrow parking spaces, should be comfortable to use. This includes in particular good visibility of the display element.

It is at least one object therefore to improve existing parking aids with respect to the utilization comfort and in particular to ensure good visibility of the display element throughout the parking process. In addition, other objects, desirable features and characteristics will become apparent from the subsequent summary and detailed description, and the appended claims, taken in conjunction with the accompanying drawings and this background.

SUMMARY

In an embodiment, a back window of a motor vehicle is stated, which comprises a display element, wherein the display element comprises at least one light conductor panel. The light conductor panel comprises a first main surface, a second main surface and a marginal surface. The light conductor panel also comprises light-decoupling structures at least in a part region of the volume of the light conductor panel, wherein the light-decoupling structures are formed as light-diffusing nano particles.

Light-diffusing nano particles in this case and in the following is to mean particles having a diameter of about 0.01 to about 0.5 micrometers, which defuse impinging light largely isotropically. The diffusion process is based in particular on Rayleigh or Mie processes. Preferably, colorless particles with a refractive index differing from that of the matrix by about $0.06 \leq \Delta n \leq 0.4$ are selected, which are distributed in the volume.

The nano particles can be additionally surrounded by an envelope layer, which improves the embedding in the surrounding material.

Through the embedding of the light-diffusing nano particles a material, which in the non-illuminated state is largely transparent, is obtained, while during a coupling-in of light via the marginal surfaces it exhibits an effective light radiation on all sides.

The light radiation via one of the main surfaces can be amplified in that the other main surface and the marginal surfaces comprise light-reflecting properties inside.

The back window makes possible a relatively large display element, which is transparent and thus largely invisible in the non-illuminated state. Accordingly, it does not interfere with the driver's vision through the back window. However, during the parking process, information relating to the parking process can be displayed to the driver in a clearly visible manner when backing-up. Thus, in any operational situation, the back window ensures the driver has a clear vision of what is currently essential.

In an embodiment, the light conductor panel comprises PMMA (polymethyl methacrylate), also known as acrylic glass. PMMA is suitable both as a matrix for embedding the light-diffusing nano particles as well as for light conductance. In addition, it can be embodied transparently.

In an embodiment, at least a part region of the back window is designed as light conductor panel. Here, the entire back window can also be designed as a light conductor panel. The light-diffusing nano particles are then selectively arranged in those regions of the light conductor panel, which serves as display element.

In an alternative embodiment, the light conductor panel is arranged adjoining the back window. Thus, it forms an element that is separate from the back window, but spatially connected with the latter. In particular, it can be arranged directly on the inside or the outside of the back window.

In an embodiment, at least one light source is arranged adjacent to the marginal surface.

The back window can also comprise at least one further light source and at least one control device for the light source and the further light source, wherein the further light source is likewise arranged adjacently to the marginal surface and wherein the at least one first and one second light source and the further light source can be activated by the at least one control device independently of one another.

Groups of light sources and further light sources can also be provided, which can be jointly activated within the group.

The light emitted by the light sources and the further light sources is coupled into these via the marginal surface of the light conductor panel and isotropically diffused in their volumes through the light-diffusing nano particles. Because of this, the light conductor panel lights up visibly from the main surface in these regions and can display signals.

In an embodiment, the light source is designed for emitting light in a first color and the further light source for emitting light in a second color that is distinct from the first color. In this manner it is possible to show multi-color signals on the display element.

The light source and/or the further light source are designed in particular as LEDs and thus have a long lifespan and a low energy consumption.

In an embodiment, the light conductor panel comprises a plurality of part regions having different densities of the light-decoupling structures. For example, a plurality of part regions doped with light-diffusing nano particles to an even or varying degree can be provided, which are separated through regions without or almost without light-diffusing nano particles arranged in between. Also conceivable are a plurality of segments doped with light-diffusing nano particles to a varying degree, wherein the concentration of the nano particles can have a stepped or continuous profile.

With these embodiments, individually illuminatable segments or regions on the display element are obtained so that, for example, the number of the illuminated segments or the degree of the illumination of a continuous region can be utilized for signal display.

In particular, the display element can serve as display element of a parking aid and/or a semi-automatic parking assistant. In an embodiment, a parking aid shows the driver in a central region of the back window the distance that still remains to a vehicle parked behind him on the display element.

A semi-automatic parking assistant assists the driver not only with the estimation of the distance to vehicles parked behind or in front, but also suggests steering movements as a function of length and geometry of the parking space, which make possible parking on an optimal path. To this end, display elements can be arranged in lateral regions of the back window.

In an embodiment, a motor vehicle with the described back window is stated. Here, the display element arranged in the region of the back window can be provided in particular for displaying information relating to a parking process.

According to a further embodiment, a method for displaying information relating to a parking process is stated on a display element in the region of the back window of a motor vehicle, wherein light, radiated into a light conductor panel of the display element via a marginal surface, is diffused on light-diffuse nano particles in the volume of the light conductor panel and decoupled via at least one main surface of the light conductor panel.

Here, in an embodiment, information relating to the distance to an obstacle and/or recommended steering movements are displayed on the display element. In this embodiment, the method is configured as a parking aid or semi-automatic parking assistant.

In an embodiment, information is shown on the display element through the number of illuminated segments or the size of an illuminated region of the display element.

Alternatively or additionally it is conceivable to show information on the display element through the color of the light decoupled from the main surface of the light conductor panel.

Alternatively or additionally it is conceivable for generating a flashing signal, to periodically radiate light into the light conductor panel and show information on the display element through the frequency of the flashing signal.

BRIEF DESCRIPTION OF THE DRAWINGS

The present invention will hereinafter be described in conjunction with the following drawing figures, wherein like numerals denote like elements, and wherein:

FIG. 1 shows a motor vehicle with a back window according to an embodiment of the invention;

FIG. 2 shows a cross section through a back window according to a first embodiment;

FIG. 3 shows a cross section through a back window according to a second embodiment;

FIG. 4 shows a perspective view of a light conductor panel for the back window according to FIG. 1;

FIG. 5 shows a cross section through a light conductor panel for the back window according to FIG. 1;

FIG. 6 shows a top view of a display element according to an embodiment; and

FIG. 7 shows a top view of a display element according to a further embodiment.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Same parts are provided with the same reference characters in all Figures.

FIG. 1 shows a motor vehicle 1, which is equipped with an electronic parking aid. To this end, it comprises a centrally arranged display element 3 in the region of its back window 2 and two further laterally arranged display elements 4.

FIG. 2 shows a cross section through the back window 2 of the motor vehicle 1 at the height of the centrally arranged display element 3 according to a first embodiment. The display element 3 comprises a light conductor panel 5 with a first main surface 6, a second main surface 7 as well as marginal surfaces, of which in FIG. 1 the marginal surfaces 8 and 9 are shown.

The back window 2 comprises an inside 10 and an outside 11. In the shown first embodiment, the light conductor panel 5 with its second main surface 7 is arranged on the inside 10 of the back window 2 and for example glued or screwed to the latter.

The light conductor panel 5 conducts light in the plane of its main surfaces 6, 7 through total reflection on the main surfaces 6, 7. The light conductor panel is formed of PMMA with light-diffusing nano particles embedded in the matrix of PMMA. For the sake of clarity, the nano particles are shown only in the following FIGS. 4-7.

In the region of the back shelf 12, a light source 13 in the form of an LED or of a group of LEDs is provided, which radiates light into the light conductor panel 5 through the marginal surface 8. Because of the isotropic diffusion on the nano particles, light leaves the light conductor panel 5 in the direction of the arrows 14 through the first main surface 6 and thus in the direction of the driver. The light is thus visible to the driver when looking back onto the back window 2.

FIG. 3 shows a second embodiment of the back window 2. The back window 2 according to the second embodiment differs from that according to the first one in that it is altogether designed as light conductor panel 5.

In the central region, which forms the display element 3, it comprises embedded, light-diffusing nano particles. With this embodiment, light is radiated into the marginal side 8 of the back window 2, specifically from the top by means of a light source 13 designed as LED, which is arranged in the region of the headlining 15. Alternatively or additionally, light sources can also be provided in the region of the back shelf 12.

Since light-diffusing nano particles are only provided in the central region of the display element 3, light is only diffused and thus visible to the driver in this region along the arrows 14.

In a third embodiment which is not shown, only a region of the back window is designed as a light conductor panel and welded to the surrounding back window.

In all embodiments, the display element 3 in the region of the back window 2 is transparent in the non-illuminated state and thus almost invisible to the driver. His vision through the back window 2 is thus not obstructed.

FIG. 4 schematically shows a perspective view of a light conductor panel 5 for the back window 2 according to FIG. 1. The light conductor panel 5 is designed of PMMA and in its volume comprises light-diffusing nano particles 16 embedded in the matrix of PMMA. In the representation in FIG. 4, the nano particles 16 are shown homogeneously distributed in the volume of the light conductor panel 5 in order to illustrate the principle. In this case, the light conductor panel 5, when suitably illuminated evenly, evenly radiates diffused light over its entire surface. When used in a display element 3, it can be desirable, however, to create the possibility for a representation of detailed information. To this end, it is also possible that only individually selected regions of the light conductor panel 5 comprise the nano particles 16 and can be illuminatable separately from one another, as is shown in the FIGS. 6 and 7.

FIG. 5 shows the light conductor panel 5 in cross section. Via the marginal surface 8, light of the light source 13 is radiated into the light conductor panel 5, which is totally reflected on the main surface 6 and 7 and accordingly spreads preferentially in the plane of the main surfaces 6, 7. In addition, the inner surfaces of the main surface 7 and of the marginal surfaces 8, 9 are provided with a reflective coating 27, in order to prevent any loss of light output. On the nano particles 16 embedded in the volume of the light conductor panel 5 the light is isotropically diffused because of Raleigh or Mie processes. Thus it leaves the light conductor panel 5 through the main surface 6 in the direction of the arrows 14. In this embodiment, this produces an even illumination of the light conductor panel 5 on its first main surface 6.

FIG. 6 schematically shows a top view of a display element 3 according to an embodiment. The display element 3 in this embodiment is designed as a display of a parking aid function, which indicates the distance to a vehicle parked behind.

In this embodiment, the nano particles 16 are not homogeneously distributed in the volume of the light conductor panel 5, but are individually concentrated in regions that are separated from one another. The display element comprises an annular region 18 and five segments 19 arranged therein, in which in each case light-diffusing nano particles 16 are present. The individual regions are separated from one another by PMMA without embedded nano particles 16.

The individual regions are illuminatable separately from one another. For illuminating the annular region 18, a light source 13 is provided, which can also consist of a group of light sources, which are arranged on different sides about the light conductor panel 5. For illuminating the segments 19, at least one further light source 20 to 24 each is provided per segment 19. All light sources 13 and 20 to 24 can be activated separately from one another.

In operation, for example the activation of the parking aid function is displayed through the illumination of the annular region 18. The annular region 18 is thus always illuminated when the parking aid function is active. In the case of a large distance to the vehicle parked behind, none of the segments 19 is additionally illuminated. When undershooting a fixed limit, the further light source 20 illuminates the first segment 19, when undershooting a further limit, the further light source 21 illuminates the second segment 19 and so on until at a fixed minimum distance all segments 19 are illuminated.

In order to achieve a clear separation of the illumination of the individual regions, a plurality of individual panels for example can be placed on top of one another with their main surfaces and joined to form the light conductor panel 5, wherein these individual planes are separated from one another through total reflection boundaries. By this it can be achieved for example that the light of the light source 13 unintentionally illuminates the segments 19. With this embodiment, two individual panels can for example be joined together, wherein the one contains the annular region 18 and the other the segments 19.

A composition of the light conductor panel 5 of a plurality of individual panels can be generally used in order to achieve a clear separation of the illumination of different regions of the display element 3.

FIG. 7 schematically shows a top view of a display element 4, according to a further embodiment. With this embodiment, the display element 4 is designed as a display of a semi-automatic parking assistant and arranged in a lateral region of the back window 2. In an embodiment which is not shown, such a display can also be provided in a central region of the back window 2.

The light conductor panel 5 in this embodiment comprises two regions doped with nano particles 16, of which the first region 25 shows an arrow pointing to the left and the second region 26 an arrow pointing to the right. For each of the regions 25, 26 an individually activatable light source 13, 17 or in each case a group of light sources is provided.

In the case of an activated parking assistant, the driver is shown a suggestion for a steering wheel movement to the left or right through illumination of the regions 25 or 26. The intensity of the required steering wheel turn can be additionally indicated through a flashing frequency. To this end, the light sources 13, 17 are activated in such a manner that they emit a periodic light signal.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A back window for a motor vehicle comprising:
   a transparent display element, wherein the transparent display element comprises a light conductor panel, and the light conductor panel comprises:
   a first main surface;
   a second main surface;
   a marginal surface; and
   light-decoupling structures at least in a part region of a volume of the light conductor panel, wherein the light-decoupling structures are embodied as light-diffusing nano particles.

2. The back window according to claim 1, wherein the light conductor panel comprises PMMA.

3. The back window according to claim 1, wherein the part region of the back window is embodied as the light conductor panel.

4. The back window according to claim 1, wherein the light conductor panel is arranged adjoining the back window.

5. The back window according to claim 1, wherein a light source is arranged adjacent to the marginal surface.

6. The back window according to claim 5, further comprising a further light source and a control device for the light source and the further light source, wherein the further light source is arranged adjacent to the marginal surface and wherein the light source and the further light source are activated from the control device independently of each other.

7. The back window according to claim 6, wherein the light source is configured for emitting light in a first color and the further light source is configured for emitting light in a second color that is distinct from the first color.

8. The back window according to claim 6, wherein the light source and/or the further light source are each configured as an LED.

9. The back window according to claim 1, wherein the light conductor panel comprises a plurality of part regions with different densities of the light-decoupling structures.

10. A motor vehicle comprising:
a back window having a transparent display element, wherein the transparent display element comprises a light conductor panel, and the light conductor panel comprises:
  a first main surface;
  a second main surface;
  a marginal surface; and
  light-decoupling structures at least in a part region of a volume of the light conductor panel, wherein the light-decoupling structures are configured as light-diffusing nano particles, and
a control device, wherein the control device is configured to display information on the transparent display element relating to a distance to an obstacle and/or recommended steering movements on the display element when the vehicle is being parked.

11. The back window according to claim 10, wherein the light conductor panel comprises PMMA.

12. The back window according to claim 10, wherein the part region of the back window is configured as the light conductor panel.

13. The back window according to claim 10, wherein the light conductor panel is arranged adjoining the back window.

14. The back window according to claim 10, wherein a light source is arranged adjacent to the marginal surface.

15. The back window according to claim 14, further comprising a further light source and a control device for the light source and the further light source, wherein the further light source is arranged adjacent to the marginal surface and wherein the light source and the further light source are activated by the control device independently of each other.

16. A method for displaying information relating to a parking process on a display element in a region of a back window of a motor vehicle, the method comprising the steps of:
  radiating a light into a light conductor panel of the display element via a marginal surface;
  diffusing the light in a volume of the light conductor panel on light-diffusing nano particles;
  decoupling the light via at least one main surface of the light conductor panel; and
  displaying information relating to a distance to an obstacle and/or recommended steering movements on the display element.

17. The method according to claim 16, wherein information on the display element is represented through a number of illuminated segments or a size of an illuminated region of the display element.

18. The method according to claim 16, wherein information on the display element is represented through a color of the light decoupled from a main surface of the light conductor panel.

19. The method according to claim 16, further comprising generating a flashing signal light periodically radiated into the light conductor panel and wherein information on the display element is represented through a frequency of the flashing signal light.

* * * * *